United States Patent
Sugawara

(10) Patent No.: US 12,202,551 B2
(45) Date of Patent: Jan. 21, 2025

(54) VEHICLE FLOOR BOARD AND METHOD FOR MANUFACTURING THE SAME

(71) Applicant: SUBARU CORPORATION, Tokyo (JP)

(72) Inventor: Mamoru Sugawara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 242 days.

(21) Appl. No.: 17/481,515

(22) Filed: Sep. 22, 2021

(65) Prior Publication Data

US 2022/0105992 A1 Apr. 7, 2022

(30) Foreign Application Priority Data

Oct. 2, 2020 (JP) .................. 2020-167917

(51) Int. Cl.
    *B62D 25/20* (2006.01)
    *B32B 3/30* (2006.01)
    (Continued)

(52) U.S. Cl.
    CPC ............... *B62D 25/20* (2013.01); *B32B 3/30* (2013.01); *B32B 5/20* (2013.01); *B32B 27/065* (2013.01);
    (Continued)

(58) Field of Classification Search
    CPC ...... B62D 25/20; B62D 29/008; B62D 29/04; B62D 25/2054; B32B 3/30; B32B 5/20; B32B 27/065; B32B 27/32; B32B 2266/0278; B32B 2307/744; B32B 2605/003; B32B 3/28; B32B 15/046;
    (Continued)

(56) References Cited

U.S. PATENT DOCUMENTS 1,776,510 A * 9/1930 Keys ............... B62D 25/20
                                                  296/193.07
3,914,487 A * 10/1975 Azoulay ............ A41D 31/00
                                                  428/141
(Continued)

FOREIGN PATENT DOCUMENTS

CN    202130389 U    2/2012
CN    204095924 U *  1/2015
(Continued)

OTHER PUBLICATIONS

Office Action issued Apr. 2, 2024 for Japanese Application No. 2020-167917. (2 pages in Japanese; 3 pages English translation).

*Primary Examiner* — Pinel E Romain

(74) *Attorney, Agent, or Firm* — Smith, Gambrell & Russell, LLP

(57) ABSTRACT

A vehicle floor board includes a first plate, a second plate, a main body material, a projection, and an anti-slipping member. The first plate and the second plate are substantially flat and are disposed substantially parallel to each other with an interval therebetween. A space between the first plate and the second plate is filled with the main body material. The projection is provided on the first plate and projects in a direction away from the second plate. The anti-slipping member is provided on a surface of the first plate and at least partially covers the projection. The surface of the first plate races away from the second plate.

22 Claims, 4 Drawing Sheets

(51) Int. Cl.
  *B32B 5/20* (2006.01)
  *B32B 27/06* (2006.01)
  *B32B 27/32* (2006.01)
  *B62D 29/00* (2006.01)
  *B62D 29/04* (2006.01)

(52) U.S. Cl.
  CPC ............ *B32B 27/32* (2013.01); *B62D 29/008* (2013.01); *B62D 29/04* (2013.01); *B32B 2266/0278* (2013.01); *B32B 2307/744* (2013.01); *B32B 2605/003* (2013.01)

(58) Field of Classification Search
  CPC ....... B32B 15/20; B32B 2250/40; B32B 3/08; B32B 2605/08; B60R 2013/015; B60R 13/011; B29C 44/18; B29C 44/00; B29C 44/02; Y10T 428/24496–24512; Y10T 428/2457; Y10T 428/24521; Y10T 428/24537; Y10T 428/24545
  USPC ................. 296/39.3, 193.07, 37.15; 428/158
  See application file for complete search history.

(56) References Cited

U.S. PATENT DOCUMENTS

| | | | | |
|---|---|---|---|---|
| 4,844,849 A | * | 7/1989 | Miller ..................... | B44C 3/044 264/46.4 |
| 4,917,431 A | * | 4/1990 | McDonald .............. | B60R 13/01 296/39.1 |
| 5,013,597 A | * | 5/1991 | Kracke ................... | B60R 13/08 428/156 |
| 5,722,711 A | * | 3/1998 | German .............. | B60R 13/0206 296/39.2 |
| 5,817,399 A | * | 10/1998 | Kalman ................. | E04F 11/16 427/372.2 |
| 6,283,518 B1 | * | 9/2001 | Burtin ..................... | B60R 19/44 293/142 |
| 8,690,233 B2 | * | 4/2014 | Preisler ..................... | B60R 5/04 296/193.07 |
| 9,005,768 B2 | | 4/2015 | Mizrahi et al. | |
| 9,010,834 B2 | * | 4/2015 | Preisler ................. | B60R 13/013 296/39.3 |
| 9,707,725 B2 | * | 7/2017 | Preisler ................... | B29C 43/18 |
| 9,962,909 B2 | * | 5/2018 | Mizrahi .................. | B32B 15/08 |
| 10,189,509 B2 | * | 1/2019 | Aizawa ................ | B62D 29/043 |
| 11,052,585 B2 | * | 7/2021 | Hattensperger ... | B29C 45/14688 |
| 2003/0151274 A1 | * | 8/2003 | Buisson .................. | B60R 13/01 296/190.08 |
| 2012/0214018 A1 | | 8/2012 | Mizrahi et al. | |
| 2013/0034700 A1 | * | 2/2013 | Gordon-Duffy ........ | B32B 27/30 428/158 |
| 2014/0154461 A1 | | 6/2014 | Preisler et al. | |
| 2015/0151513 A1 | | 6/2015 | Mizrahi et al. | |
| 2019/0233122 A1 | * | 8/2019 | Maslakow .............. | B32B 3/266 |
| 2019/0375192 A1 | * | 12/2019 | Fogel ..................... | B32B 15/04 |
| 2022/0389210 A1 | * | 12/2022 | Chou ..................... | A43B 13/04 |

FOREIGN PATENT DOCUMENTS

| | | |
|---|---|---|
| DE | 10 2015 012 668 A1 | 3/2017 |
| GB | 2200600 A  * 8/1988 | ......... B62D 25/2054 |
| JP | H02-127140 A | 5/1990 |
| JP | 2001-277944 A | 10/2001 |
| JP | 2008-222208 A | 9/2008 |
| JP | 2013-001253 A | 1/2013 |
| JP | 2014-511291 A | 5/2014 |

* cited by examiner

VEHICLE FLOOR BOARD AND METHOD FOR MANUFACTURING THE SAME

CROSS-REFERENCE TO RELATED APPLICATIONS

The present application claims priority from Japanese Patent Application No. 2020-167917 filed on Oct. 2, 2020, the entire contents of which are hereby incorporated by reference.

BACKGROUND

The disclosure relates to a vehicle floor board for a trunk or the like behind a rear seat and a method for manufacturing the vehicle floor board.

A vehicle floor board that defines the floor surface of a trunk behind a rear seat of, for example, an automobile is known (see, for example, Japanese Unexamined Patent Application Publication (JP-A) No. 2013-1253). The vehicle floor board according to JP-A No. 2013-1253 includes a fiber layer composed of a composition board and surface layers stacked on both sides of the fiber layer.

A composite material including a first plate, a second plate, and a core layer disposed between the first and second plates is also known (see, for example, Japanese Unexamined Patent Application Publication (Translation of PCT Application) (JP-T) No. 2014-511291). According to JP-T No. 2014-511291, each plate is a metal plate, and the core layer is made of polymer.

SUMMARY

An aspect of the disclosure provides a vehicle floor board including a first plate, a second plate, a main body material, a projection, and an anti-slipping member. The first plate and the second plate are substantially flat and are disposed substantially parallel to each other with an interval therebetween. A space between the first plate and the second plate is filled with the main body material. The projection is provided on the first plate and projects in a direction away from the second plate. The anti-slipping member is provided on a surface of the first plate and at least partially covers the projection. The surface of the first plate faces away from the second plate.

An aspect of the disclosure provides method for manufacturing the vehicle floor board. The main body material is made of foamed plastic, and the method includes forming the projection of the first plate by applying a pressure generated during foaming of the foamed plastic.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 4A illustrates the upper plate before deformation and FIG. 4B illustrates the upper plate after deformation;

DETAILED DESCRIPTION

A vehicle floor board composed of the composite material described in JP-T No. 2014-511291 has a problem that when the thickness of each plate is increased to increase the rigidity of the floor board, the weight and cost of the plates are increased.

An anti-slipping member may be provided on an upper surface of the vehicle floor board to prevent movement of an object, such as luggage, placed on the vehicle floor board. In such a case, the anti-slipping member is provided on a flat upper surface of the floor board. When the object, such as luggage, is moved on the floor board or when the vehicle is running, the anti-slipping member may receive an excessive sideways load from the object and become separated from the upper surface of the board. In addition, when the anti-slipping member is provided on a flat plate, it is difficult to position the anti-slipping member fixed to the plate during manufacture of the floor board.

It is desirable to provide a vehicle floor board whose rigidity may be increased without increasing the thickness of each plate and in which an anti-slipping member may be easily positioned relative to a plate and is not easily separated from the plate. It is also desirable to provide a method for manufacturing the vehicle floor board.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
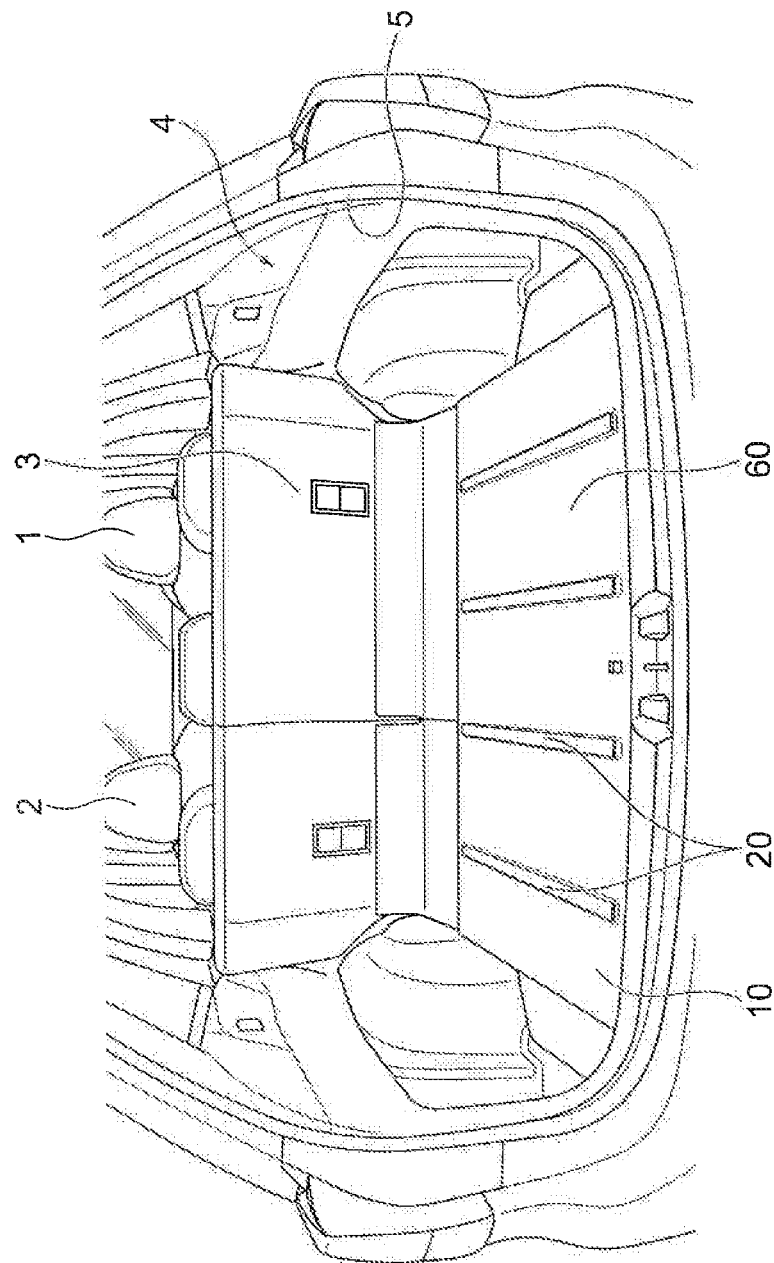
FIG. 1 illustrates a trunk of a vehicle according to an embodiment of the disclosure viewed from a rear hatch.
Figure 2:
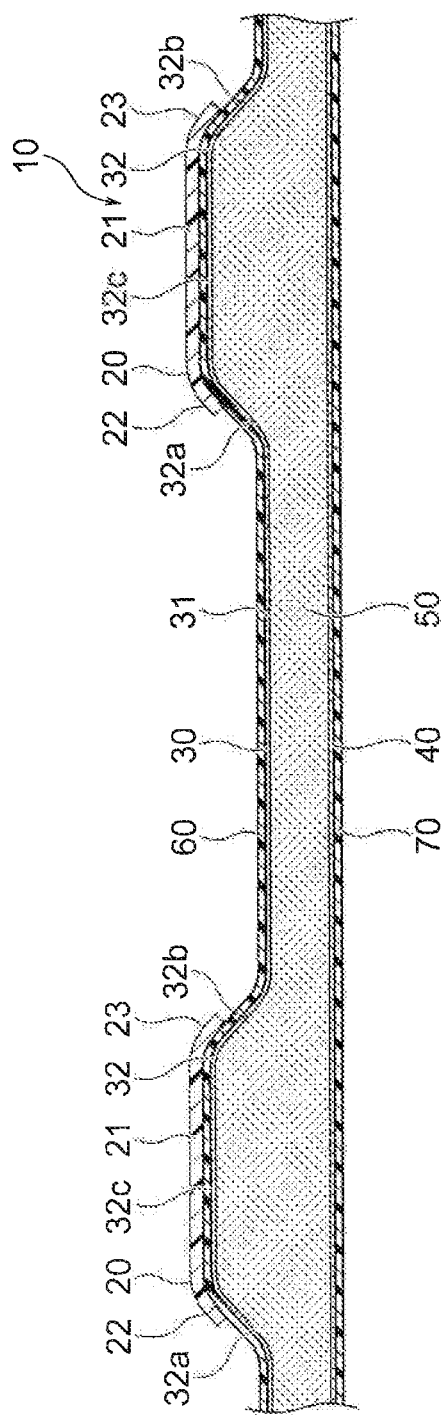
FIG. 2 is a schematic partial sectional view of a vehicle floor board.
Figure 3:
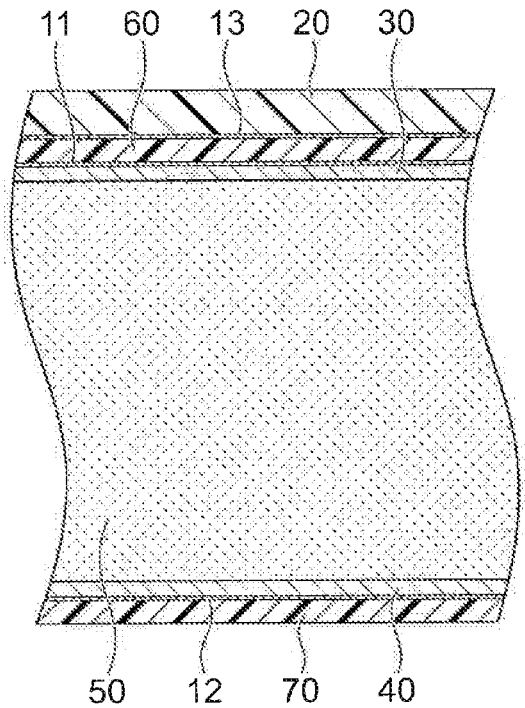
FIG. 3 is a partial enlarged sectional view of the vehicle floor board.
Figure 4A:
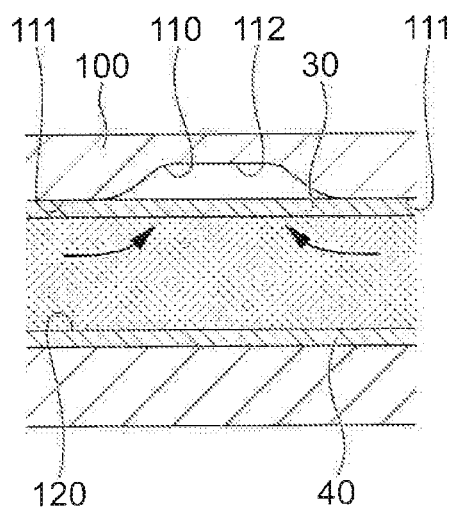
FIG. 4A and FIG. 4B illustrate a machining process performed on an upper plate during manufacture, where
Figure 4B:
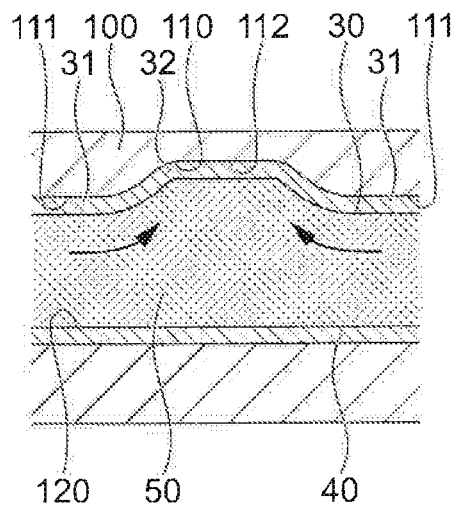
Figure 5:
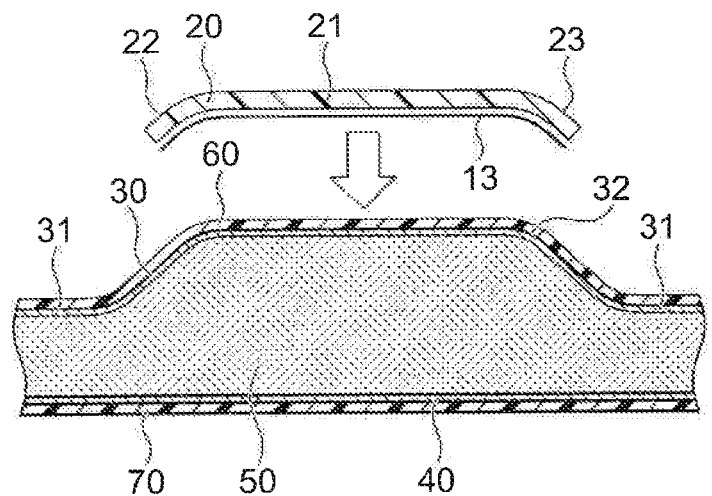
FIG. 5 illustrates attachment of an anti-slipping member to a base member.
Figure 6:
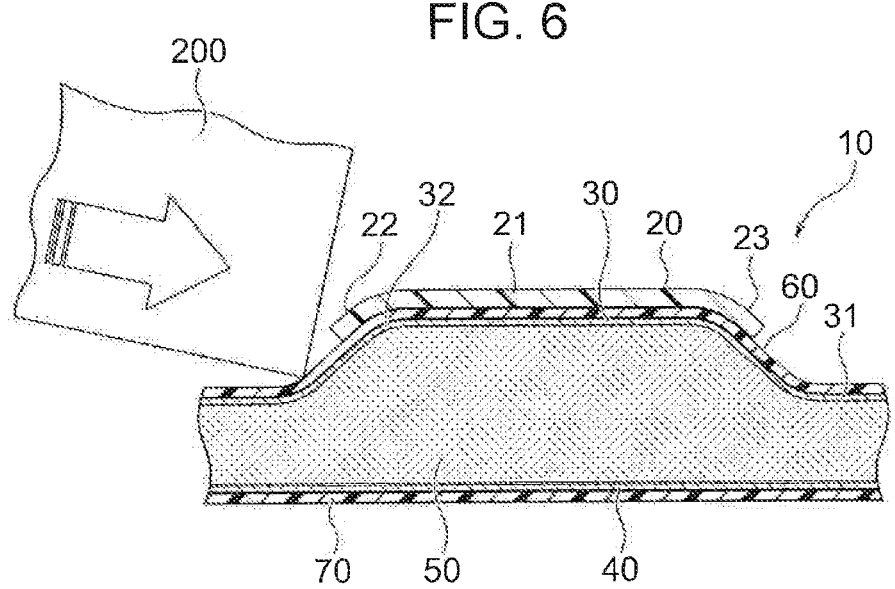
FIG. 6 illustrates a sideways load applied by an object to a projection provided with the anti-slipping member.

FIG. 1 to FIG. 6 illustrate the embodiment. FIG. 1 illustrates a trunk of a vehicle viewed from a rear hatch. FIG. 2 is a schematic partial sectional view of a vehicle floor board. FIG. 3 is a partial enlarged sectional view of the vehicle floor board. FIG. 4A and FIG. 4B illustrate a machining process performed on an upper plate during manufacture. FIG. 5 illustrates attachment of an anti-slipping member to a base member. FIG. 6 illustrates a sideways load applied by an object to a projection provided with the anti-slipping member.

As illustrated in FIG. 1, a rear seat 3 is provided behind a driver's seat 1 and a front passenger seat 2 of the vehicle, and a trunk 4 is provided behind the rear seat 3. The vehicle has a rear opening 5 that is covered with a rear hatch (not shown) and through which luggage, for example, may be placed into or taken out of the trunk 4 while the rear hatch is open. In the present embodiment, the trunk 4 has a floor surface defined by a vehicle floor board 10, which is substantially flat. The vehicle floor board 10 has a plurality of anti-slipping members 20 on an upper surface thereof. The anti-slipping members 20 are provided to prevent an object, such as luggage, placed on the vehicle floor board 10 from slipping while the vehicle is running. In the present embodiment, the anti-slipping members 20 extend in a front-rear direction and are disposed with constant intervals therebetween in a left-right direction.

As illustrated in FIG. 2, the vehicle floor board 10 includes a substantially flat upper plate 30, a substantially flat lower plate 40, and a main body material 50. The lower plate 40 is disposed substantially parallel to the upper plate 30 with an interval therebetween in a vertical direction. The space between the upper plate 30 and the lower plate 40 is filled with the main body material 50. In one embodiment, the upper plate 30 may serve as a "first plate", and the lower plate 40 may serve as a "second plate". As illustrated in FIG. 3, the vehicle floor board 10 also includes surface materials 60 and 70 that are respectively provided on an upper surface of the upper plate 30 and a lower surface of the lower plate 40. The surface materials 60 and 70 are respectively bonded to the upper plate 30 and the lower plate 40 with adhesives 11 and 12.

Each anti-slipping member 20 is bonded to the surface material 60 on the upper surface of the upper plate 30 with an adhesive 13.

The upper plate 30 is made of, for example, a metal. In the present embodiment, the upper plate 30 is made of aluminum. As illustrated in FIG. 2, the upper plate 30 is substantially flat overall, and includes flat portions 31 that extend in a horizontal direction and projections 32 provided at positions corresponding to the positions of the anti-slipping members 20. In the present embodiment, the projections 32 extend in the front-back direction and are disposed with predetermined intervals therebetween in the left-right direction.

Each projection 32 includes a first inclined portion 32a at a first side in the left-right direction, a second inclined portion 32b at a second side in the left-right direction, and a horizontal portion 32c that connects an end of the first inclined portion 32a at the second side in the left-right direction with an end of the second inclined portion 32b at the first side in the left-right direction. In the present embodiment, the first inclined portion 32a extends upward and toward the second side in the left-right direction from one of the flat portions 31, and the second inclined portion 32b extends upward and toward the first side in the left-right direction from another one of the flat portions 31. The horizontal portion 32c is parallel to the lower plate 40 and extends horizontally.

The lower plate 40 is made of, for example, a metal. In the present embodiment, the lower plate 40 is made of aluminum. The lower plate 40 is substantially flat overall. In the present embodiment, the lower plate 40 and the upper plate 30 have the same thickness.

The main body material 50 is made of, for example, foamed plastic. In the present embodiment, the main body material 50 is made of formed urethane. The main body material 50 is thicker than the upper plate 30 and the lower plate 40. The main body material 50 is permanently affixed to the upper plate 30 and the lower plate 40, and is in close contact with the plates 30 and 40.

The surface materials 60 and 70 are each made of, for example, a resin. In the present embodiment, the surface materials 60 and 70 are made of polyvinyl chloride. The surface materials 60 and 70 respectively cover the plates 30 and 40 over the entire areas thereof. The surface materials 60 and 70 may each have any thickness. In the present embodiment, the surface materials 60 and 70 are thicker than the plates 30 and 40 and thinner than the main body material 50.

The anti-slipping members 20 are made of, for example, a resin. In the present embodiment, the anti-slipping members 20 are made of polypropylene. As illustrated in FIG. 2, the anti-slipping members 20 are provided on respective ones of the projections 32 of the upper plate 30, and partially cover the respective projections 32 with the surface material 60 provided therebetween. In the present embodiment, each anti-slipping member 20 includes a main portion 21, a first end portion 22, and a second end portion 23. The main portion 21 covers the horizontal portion 32c of the projection 32. The first end portion 22 is provided at an end of the main portion 21 at the first side in the left-right direction, and covers an end of the first inclined portion 32a of the projection 32 at the second side in the left-right direction. The second end portion 23 is provided at an end of the main portion 21 at the second side in the left-right direction, and covers an end of the second inclined portion 32b of the projection 32 at the first side in the left-right direction. The main portion 21 extends horizontally, and the first end portion 22 and the second end portion 23 are inclined downward and outward in the left-right direction. The anti-slipping members 20 may have any thickness. In the present embodiment, the anti-slipping members 20 are thicker than the upper plate 30.

A method for manufacturing the vehicle floor board having the above-described structure will now be described.

As illustrating FIG. 4A, first, a die 100 used to mold the upper plate 30 and the lower plate 40 is prepared. The die 100 has a first molding surface 110 that shapes the upper plate 30 and a second molding surface 120 that shapes the lower plate 40. The first molding surface 110 includes flat surfaces 111 that correspond to the flat portions 31 of the upper plate 30 and recessed surfaces 112 that correspond to the projections 32 of the upper plate 30. The second molding surface 120 has a flat shape that corresponds to the flat shape of the lower plate 40.

As illustrated in FIG. 4A, the upper plate 30 and the lower plate 40 in a flat shape that are not yet processed are set to the die 100 while the first molding surface 110 and the second molding surface 120 are disposed to face each other. In this state, the upper plate 30 is in contact with the flat surfaces 111 of the first molding surface 110, and the lower plate 40 is in contact with the second molding surface 120.

Next, a material of the main body material 50 is injected into the space between the upper plate 30 and the lower plate 40 together with a foaming agent, and is foamed so that a sandwich-shaped base member in which the space between the upper plate 30 and the lower plate 40 is filled with foamed plastic is formed. As illustrated in FIG. 4B, portions of the upper plate 30 that are not in contact with the flat surfaces 111 are pressed against the recessed surfaces 112 by a pressure applied during foaming of the foamed plastic. Thus, the projections 32 of the upper plate 30 are formed.

After that, the base member is removed from the die 100, and the surface materials 60 and 70 are respectively bonded to the upper plate 30 and the lower plate 40. Then, as illustrated in FIG. 5, each anti-slipping member 20 is bonded to the corresponding projection 32 of the upper plate 30 with the surface material 60 interposed therebetween by using the adhesive 13. At this time, the anti-slipping members 20 may be positioned relative to the upper plate 30 by using the projections 32.

The vehicle floor board 10 having the above-described structure includes the upper plate 30 having the projections 32, and therefore the rigidity thereof may be increased without increasing the thicknesses of the plates 30 and 40.

In addition, the anti-slipping members 20 are fixed to the upper plate 30 while being engaged with the respective projections 32. Therefore, compared to the case where the anti-slipping members are provided on a flat plate as in the related art, the risk of separation of the anti-slipping members 20 from the upper plate 30 is reduced. The anti-slipping members 20 are not provided at the bases of the projections 32. Therefore, as illustrating FIG. 6, even if an object 200 such as luggage, comes into contact with the base of the projection 32 when the object 200 is moved on the vehicle floor board 10 or when the vehicle is running, no load is applied to the anti-slipping member 20.

Although the anti-slipping members 20 partially cover the projections 32 in the above-described embodiment, the anti-slipping members 20 may instead cover the projections 32 entirely. In addition, alternatively, a single anti-slipping member 20 may be formed to cover the upper plate 30 including the projections 32 over the entire area thereof.

Although each projection 32 of the upper plate 30 includes the first inclined portion 32a, the second inclined portion 32b, and the horizontal portion 32c in the above-described embodiment, the shape of each projection 32 may be changed to any shape. For example, the first inclined portion 32a and the second inclined portion 32b may be replaced by a first vertical portion and a second vertical portion that are perpendicular to the flat portions 31. Alternatively, for example, each projection 32 may instead have a semicircular or semi-elliptical shape in cross section.

In addition, although the plates 30 and 40 are each made of a metal in the above-described embodiment, the plates 30 and 40 may instead be made of other materials, such as carbon fiber reinforced plastic. In addition, although the main body material 50 is made of foamed plastic, the main body material 50 may instead be made of other materials, such as non-foamed plastic.

Although an embodiment of the disclosure has been described, the above-described embodiment does not limit the disclosure as claimed. It is to be noted that not all of the combinations of the features described in the embodiment are to be provided to solve the problems solved by the embodiment of the disclosure.

According to an embodiment of the disclosure, the rigidity of the vehicle floor board may be increased without increasing the thickness of each plate. In addition, the anti-slipping members may be easily positioned relative to a plate and are not easily separated from the plate.

The invention claimed is:

1. A vehicle floor board comprising:
a first plate and a second plate that are substantially flat and disposed substantially parallel to each other with an interval therebetween;
a foamed plastic main body material with which a space between the first plate and the second plate is filled;
a projection that is provided on the first plate and that projects in a direction away from the second plate as to define a projection portion in the first plate that extends up from, and is adjacent to, a substantially flat portion of the first plate that extends away from the projection portion; and
an anti-slipping member that is provided on a surface of the first plate and that at least partially covers the projection, the surface of the first plate facing away from the second plate, and wherein the foamed plastic material of the main body material extends within the interval in a supporting relationship with both the projection portion and the substantially flat portion extending away from the projection portion.

2. A vehicle floor board comprising:
a first plate and a second plate that are substantially flat and disposed substantially parallel to each other with an interval therebetween;
a main body material with which a space between the first plate and the second plate is filled;
a projection that is provided on the first plate and that projects in a direction away from the second plate; and
an anti-slipping member that is provided on a surface of the first plate and that at least partially covers the projection, the surface of the first plate facing away from the second plate, wherein the first plate and the second plate are made of a metal.

3. The vehicle floor board according to claim 2, wherein the first plate and the second plate are made of aluminum.

4. The vehicle floor board according to claim 1, wherein the main body material made of foamed plastic entirely fills the interval between the sandwiching first and second plates.

5. The vehicle floor board according to claim 2, wherein the main body material is made of foamed plastic.

6. The vehicle floor board according to claim 3, wherein the main body material is made of foamed plastic.

7. A method for manufacturing the vehicle floor board according to claim 4, the method comprising:
forming the projection of the first plate by applying a pressure generated during foaming of the foamed plastic.

8. A method for manufacturing the vehicle floor board according to claim 5, the method comprising:
forming the projection of the first plate by applying a pressure generated during foaming of the foamed plastic.

9. A method for manufacturing the vehicle floor board according to claim 6, the method comprising:
forming the projection of the first plate by applying a pressure generated during foaming of the foamed plastic.

10. The vehicle floor board according to claim 1, wherein the first plate defines a base surface that is substantially flat, and the projection comprises an upper surface and two side walls, with the two side walls each extending from the upper surface down toward the base surface.

11. The vehicle floor board according to claim 10, wherein the two side walls incline down and outward in extending from the upper surface to the base surface.

12. The vehicle floor board according to claim 10, wherein the projection is elongated in a first direction extending along the base surface, with the upper surface of the projection being substantially parallel with the base surface.

13. The vehicle floor board according to claim 12, wherein the anti-slip member is also elongated in the first direction and covers the upper surface as well as only portions of the two side walls.

14. The vehicle floor board according to claim 10, wherein the projection is one of a group of projections each being elongated in a first direction extending along the first plate, with the projections being spaced apart in a direction perpendicular to the first direction and with the foamed plastic material of the main body material extending along the substantially flat portion entirely from one of the projections to an adjacent one of the projections.

15. The vehicle floor board according to claim 14, wherein the anti-slip member is one of a group of anti-slip members each being supported by a respective one of the projections and each also being elongated in the first direction.

16. The vehicle floor board according to claim 2, wherein the first plate of metal has an upper surface that is covered with a first resin surface material layer.

17. The vehicle floor board according to claim 16, wherein the second plate of metal has a lower surface that is covered with a second resin surface material layer.

18. The vehicle floor board according to claim 17, wherein the first resin surface material layer covers an entire area of the upper surface of the first plate and the second resin surface material layer covers the entire area of the lower surface of the second plate.

19. The vehicle floor board according to claim 16, wherein the anti-slip member is bonded to the first resin surface material layer.

20. The vehicle floor board according to claim 19, wherein the anti-slip member is formed of a resin that is different than the resin of the first resin surface material.

21. A vehicle floor board comprising:
a first plate and a second plate that are substantially flat and disposed substantially parallel to each other with an interval therebetween;
a main body material with which a space between the first plate and the second plate is filled;
a projection that is provided on the first plate and that projects in a direction away from the second plate; and
an anti-slipping member that is provided on a surface of the first plate and that at least partially covers the projection, the surface of the first plate facing away from the second plate, and wherein the first plate is made of metal and the projection is a metal portion of the first plate.

22. The vehicle floor board of claim 21 wherein the main body material fills the interval such that the main body material has a greater thickness than the first plate.

* * * * *